(12) United States Patent
Saito et al.

(10) Patent No.: US 10,058,846 B2
(45) Date of Patent: Aug. 28, 2018

(54) CATALYST FOR PURIFYING EXHAUST GAS

(71) Applicants: Yoshinori Saito, Toyota (JP); Masahide Miura, Toyota (JP); Seiji Nakahigashi, Toyota (JP); Hiromasa Suzuki, Toyota (JP); Takahiro Suzuki, Kakegawa (JP); Kosuke Iizuka, Kakegawa (JP); Minoru Ito, Kakegawa (JP); Ryota Nakashima, Kakegawa (JP)

(72) Inventors: Yoshinori Saito, Toyota (JP); Masahide Miura, Toyota (JP); Seiji Nakahigashi, Toyota (JP); Hiromasa Suzuki, Toyota (JP); Takahiro Suzuki, Kakegawa (JP); Kosuke Iizuka, Kakegawa (JP); Minoru Ito, Kakegawa (JP); Ryota Nakashima, Kakegawa (JP)

(73) Assignees: TOYOTA JIDOSHA KABUSHIKI KAISHA, Toyota-shi, Aichi (JP); CATALER CORPORATION, Kakegawa-shi, Shizuoka (JP)

( * ) Notice: Subject to any disclaimer, the term of this patent is extended or adjusted under 35 U.S.C. 154(b) by 0 days.

(21) Appl. No.: 15/663,952

(22) Filed: Jul. 31, 2017

(65) Prior Publication Data
US 2018/0065111 A1   Mar. 8, 2018

(30) Foreign Application Priority Data

Sep. 5, 2016 (JP) .................... 2016-172744
Mar. 31, 2017 (JP) .................... 2017-072467

(51) Int. Cl.
*B01J 23/10* (2006.01)
*B01J 23/63* (2006.01)
(Continued)

(52) U.S. Cl.
CPC ............ *B01J 23/10* (2013.01); *B01D 53/945* (2013.01); *B01J 20/0211* (2013.01);
(Continued)

(58) Field of Classification Search
CPC ... B01J 23/10; B01J 23/63; B01J 21/06; B01J 35/0006; B01J 35/023; B01J 35/04
See application file for complete search history.

(56) References Cited

U.S. PATENT DOCUMENTS 7,247,597 B2 * 7/2007 Morikawa ................ B01J 23/10
    423/594.12
8,202,819 B2 * 6/2012 Kohara .............. B01D 53/9468
    422/169

(Continued)

FOREIGN PATENT DOCUMENTS

JP    2012-086199 A    5/2012
JP    5202336 B2    6/2013
(Continued)

*Primary Examiner* — Cam N. Nguyen
(74) *Attorney, Agent, or Firm* — Sughrue Mion, PLLC

(57) ABSTRACT

An catalyst for purifying exhaust gas comprising an OCS material that has sufficient heat resistance and achieves a favorable balance between the oxygen storage volume and the oxygen absorption/release rate includes an catalyst for purifying exhaust, which has a substrate and a catalyst coating layer formed on the substrate, wherein the catalyst coating layer comprises a ceria-zirconia-based composite oxide having a pyrochlore structure in an amount of 5 to 100 g/L based on the volume of the substrate, the ceria-zirconia-based composite oxide has a secondary particle size (D50) of 3 μm to 7 μm, and the ceria-zirconia-based composite oxide optionally contains praseodymium.

6 Claims, 10 Drawing Sheets

(51) Int. Cl.
B01J 21/06 (2006.01)
B01J 35/00 (2006.01)
B01J 35/02 (2006.01)
B01J 35/04 (2006.01)
B01J 20/02 (2006.01)
B01J 20/28 (2006.01)
B01J 37/02 (2006.01)
B01J 20/32 (2006.01)
B01D 53/94 (2006.01)

(52) U.S. Cl.
CPC ..... B01J 20/0225 (2013.01); B01J 20/28004 (2013.01); B01J 20/3236 (2013.01); B01J 23/63 (2013.01); B01J 35/0006 (2013.01); B01J 35/023 (2013.01); B01J 37/0244 (2013.01); *B01D 2255/1023* (2013.01); *B01D 2255/1025* (2013.01); *B01D 2255/2061* (2013.01); *B01D 2255/2063* (2013.01); *B01D 2255/2066* (2013.01); *B01D 2255/2092* (2013.01); *B01D 2255/407* (2013.01); *B01D 2255/908* (2013.01); *B01D 2255/9022* (2013.01); *B01D 2255/9202* (2013.01)

(56) References Cited

U.S. PATENT DOCUMENTS

| | | | | |
|---|---|---|---|---|
| 8,337,791 | B2* | 12/2012 | Kohara | B01D 53/945 423/213.2 |
| 8,697,600 | B2* | 4/2014 | Nobukawa | B01D 53/945 502/302 |
| 8,853,120 | B2* | 10/2014 | Aoki | B01D 53/945 502/302 |
| 9,308,516 | B2* | 4/2016 | Houshito | B01J 23/63 |
| 9,376,327 | B2* | 6/2016 | Morikawa | B01J 35/04 |
| 9,539,542 | B2* | 1/2017 | Mikita | B01D 53/945 |
| 2010/0061903 | A1 | 3/2010 | Kohara et al. | |
| 2011/0274603 | A1* | 11/2011 | Kohara | B01D 53/945 423/213.5 |
| 2012/0021899 | A1* | 1/2012 | Nobukawa | B01D 53/945 502/304 |
| 2012/0094827 | A1* | 4/2012 | Matsueda | B01D 53/945 502/304 |
| 2013/0143732 | A1* | 6/2013 | Aoki | B01D 53/9445 502/304 |
| 2013/0203588 | A1 | 8/2013 | Nobukawa | |
| 2015/0273437 | A1* | 10/2015 | Miura | B01J 37/03 502/303 |
| 2015/0290621 | A1 | 10/2015 | Miura et al. | |
| 2016/0121302 | A1* | 5/2016 | Morikawa | B01J 23/10 502/303 |
| 2016/0184801 | A1 | 6/2016 | Morikawa et al. | |
| 2016/0250620 | A1* | 9/2016 | Morikawa | C01G 25/00 502/303 |
| 2016/0288096 | A1* | 10/2016 | Fujiwara | B01J 37/0244 |
| 2016/0288100 | A1* | 10/2016 | Goto | B01J 23/63 |
| 2017/0072386 | A1* | 3/2017 | Hayashida | B01J 23/10 |

FOREIGN PATENT DOCUMENTS

| | | |
|---|---|---|
| JP | 2014-114196 A | 6/2014 |
| JP | 2015-034113 A | 2/2015 |

\* cited by examiner

CATALYST FOR PURIFYING EXHAUST GAS

CROSS-REFERENCE TO RELATED APPLICATIONS

The disclosure of Japanese Patent Application Nos. JP 2016-172744 filed on Sep. 5, 2016 and JP 2017-072467 filed on Mar. 31, 2017 is incorporated herein by reference in its entirety.

BACKGROUND

Field

Exemplary embodiments relate to a catalyst for purifying exhaust gas.

Description of Related Art

Exhaust gas emitted from an internal-combustion engine of a vehicle or the like contains harmful gases such as carbon monoxide (CO), nitrogen oxide (NOx), and unburned hydrocarbon (HC). In a catalyst for purifying exhaust gas (so-called three-way catalyst) which decomposes such harmful gases, a ceria-zirconia-based composite oxide and the like having oxygen storage capacity (OSC) are used as a support catalyst. An oxygen storage capacity material (OSC material) such as ceria-zirconia-based composite oxide has effects of controlling an air-fuel ratio (A/F) in a micro space by absorbing and releasing oxygen and suppressing a decrease in the purification rate due to variations in exhaust gas composition.

Hitherto, OSC materials used for catalysts for purifying exhaust gas are required to have the oxygen storage volume and heat resistance at sufficient levels for maintaining oxygen absorption/release capacity for a long period of time, and also to have sufficiently excellent oxygen storage capacity even after being exposed to high temperatures for a long period of time. In response to such requirements, JP Patent Publication (Kokai) No. 2015-34113 A suggests a ceria-zirconia-based composite oxide having a pyrochlore structure, for which the primary particle size, the content ratio of cerium and zirconium, and the like are specified. Specifically, JP Patent Publication (Kokai) No. 2015-34113 A discloses a ceria-zirconia-based composite oxide, which is characterized in that primary particles having particle sizes of 1.5 to 4.5 μm account for 50% or more based on all primary particles in the ceria-zirconia-based composite oxide on a particle number basis, the content ratio of cerium to zirconium in the ceria-zirconia-based composite oxide is within a range of 43:57 to 55:45 ([cerium]:[zirconium]) by mole, and the strength ratio between the diffraction line at 2θ=14.5° and the diffraction line at 2θ=29° {I (14/29) value} and the strength ratio between the diffraction line at 2θ=28.5° and the diffraction line at 2θ=29° {I (28/29) value} each of which is calculated based on an X-ray diffraction pattern using CuKα obtained via X-ray diffraction measurement after heating of ceria-zirconia-based composite oxide in the atmosphere at 1100° C. for 5 hours, satisfy the following conditions, respectively: I (14/29) value≥0.015, I (28/29) value≤0.08. The ceria-zirconia-based composite oxide disclosed in JP Patent Publication (Kokai) No. 2015-34113 A is specified with its primary particle size; however, its secondary particle size is not specifically described.

In addition, JP Patent Publication (Kokai) No. 2014-114196 A discloses a composite oxide material, which is characterized in that it contains crystal particles having a pyrochlore structure of ceria-zirconia-based composite oxide and a crystal having a fluorite structure of ceria-zirconia-based composite oxide, which is present on the particle surfaces, the crystal having a fluorite structure of ceria-zirconia-based composite oxide contains zirconia in an amount greater than the amount of ceria and is integrated with the crystal particles having a pyrochlore structure of ceria-zirconia-based composite oxide. JP Patent Publication (Kokai) No. 2014-114196 A describes that a ceria-zirconia-based composite oxide having a pyrochlore structure with an average secondary particle size of 11 μm was prepared.

In recent days, there is a demand to provide an USC material used for catalysts for purifying exhaust gas, which has not only heat resistance and the oxygen storage volume at sufficient levels but also a sufficiently large oxygen absorption/release rate for exhibition of more rapid behavior in order to downsize such catalysts.

However, in the case of conventional ceria-zirconia-based composite oxide, when the crystal structure is a fluorite structure, the oxygen absorption/release rate is large but the oxygen storage volume is small, and when the crystal structure is a pyrochlore structure, the oxygen storage volume is large but the oxygen absorption/release rate is small. Therefore, it has been difficult to achieve a favorable balance between the oxygen storage volume and the oxygen absorption/release rate.

SUMMARY

As stated above, for conventional catalysts for purifying exhaust gas, when the crystal structure of ceria-zirconia-based composite oxide used as an OSC material is a fluorite structure, the oxygen absorption/release rate is large but the oxygen storage volume is small, and when the crystal structure thereof is a pyrochlore structure, the oxygen storage volume is large but the oxygen absorption/release rate is small. Therefore, it has been difficult to achieve a favorable balance between the oxygen storage volume and the oxygen absorption/release rate while maintaining sufficient heat resistance. In view of this, the exemplary embodiments relate to providing a catalyst for purifying exhaust gas comprising an OCS material that has sufficient heat resistance and achieves a favorable balance between the oxygen storage volume and the oxygen absorption/release rate.

For example, by setting the secondary particle size (D50) of a ceria-zirconia-based composite oxide having a pyrochlore structure within a particular range, it becomes possible to impart sufficient heat resistance to the composite oxide and achieve a favorable balance between the oxygen storage volume and the oxygen absorption/release. Based on the findings, exemplary embodiments shown below.

For example, exemplary embodiments are as follows.

(1) A catalyst for purifying exhaust gas, which has a substrate and a catalyst coating layer formed on the substrate, wherein the catalyst coating layer comprises a ceria-zirconia-based composite oxide having a pyrochlore structure in an amount of 5 to 100 g/L based on the volume of the substrate, wherein the ceria-zirconia-based composite oxide has a secondary particle size (D50) of 3 μm to 7 μm, and wherein the ceria-zirconia-based composite oxide optionally contains praseodymium.

(2) The catalyst according to (1), wherein the catalyst is a start-up catalyst (S/C) or an underfloor catalyst (WC) of a catalyst system for purifying exhaust gas including S/C and UF/C that is disposed downstream from the S/C along the flow direction of exhaust gas.

(3) The catalyst according to (2), wherein the catalyst is S/C that has at least two catalyst coating layers, and the uppermost catalyst coating layer contains the cerin-zirconia-based composite oxide in an amount of 5 to 50 g/L based on the volume of the substrate.

(4) The catalyst according to (2), wherein the catalyst is S/C that has at least two catalyst coating layers, and at least one catalyst coating layer other than the uppermost catalyst coating layer contains the ceria-zirconia-based composite oxide in an amount of 5 to 30 g/L based on the volume of the substrate.

(5) The catalyst according to (2), wherein the catalyst is UF/C that has at least two catalyst coating layers, and the uppermost catalyst coating layer contains the ceria-zirconia-based composite oxide in an amount of 5 to 20 g/L based on the volume of the substrate.

According to the exemplary embodiments, it becomes possible to provide a catalyst for purifying exhaust gas, comprising an OSC material having sufficient heat resistance, which can achieve a favorable balance between the oxygen storage volume and the oxygen absorption/release rate.

DETAILED DESCRIPTION OF THE EMBODIMENTS

Figure 1:
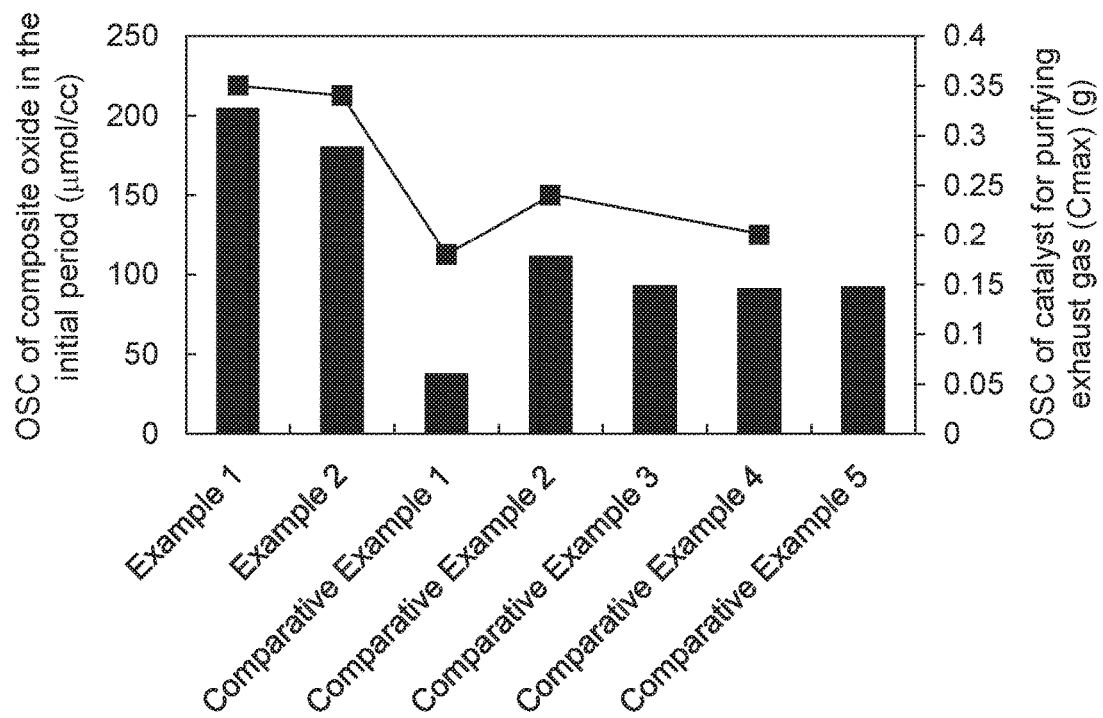
FIG. 1 shows the oxygen storage capacity (OSC) in the initial period (bar graph) of each of the ceria-zirconia-based composite oxides of Examples 1 and 2 and Comparative Examples 1 to 5 and the maximum oxygen storage amount (Cmax) (line graph) of each of catalysts for purifying exhaust gas comprising these composite oxides.

Preferred embodiments are described in detail below.

The catalyst for purifying exhaust gas of the exemplary embodiments has a substrate and a catalyst coating layer which is formed on the substrate and contains a certain amount of ceria-zirconia-based composite oxide ($Ce_2Zr_2O_7$: hereinafter also referred to as "pyrochlore-type ceria-zirconia-based composite oxide" or "pyrochlore CZ") having a pyrochlore structure.

The expression "having a pyrochlore structure" used for ceria-zirconia-based composite oxide means that a crystal phase (pyrochlore phase) having a pyrochlore-type regular array structure is formed with cerium ions and zirconium ions. Cerium ions and zirconium ions may be partially substituted with additional elements such as praseodymium. The array structure of the pyrochlore phase can be identified with 2θ angle peaks of an X-ray diffraction pattern obtained using CuKα, which are observed at 14.5°, 28°, 37°, 44.5° and 51°. The term "peak" used herein refers to a peak having a height from the baseline to the peak top of 30 cps or more. In addition, in order to obtain the diffraction line strength, an average diffraction line strength of 2θ=10° to 12° is subtracted as the background level from an individual diffraction line strength value.

The content of a regularly arrayed pyrochlore-type crystal phase in the entire crystal phase, which is obtained based on the peak strength ratio of an X-ray diffraction pattern of a ceria-zirconia-based composite oxide having a pyrochlore structure, is preferably 50% or more and particularly preferably 80% or more. The method for preparing a ceria-zirconia-based composite oxide having a pyrochlore structure is known to those skilled in the art.

The pyrochlore phase ($Ce_2Zr_2O_7$) of ceria-zirconia-based composite oxide has oxygen vacancy sites. When oxygen atoms enter the sites, phase shift from the pyrochlore phase to the κ phase ($Ce_2Zr_2O_8$) occurs. Meanwhile, the κ phase can release oxygen atoms such that phase shift from the κ phase to the pyrochlore phase occurs. Oxygen storage capacity of ceria-zirconia-based composite oxide is capacity to absorb/release oxygen upon phase shift between the pyrochlore phase and the κ phase.

Here, it is known that phase shift from the κ phase of ceria-zirconia-based composite oxide to the crystal phase (CeZrO4: fluorite-type phase) having a fluorite structure occurs as a result of rearrangement. In a lean atmosphere and particularly a high-temperature lean atmosphere, phase shift from the κ phase to the fluorite-type phase tends to occur in pyrochlore CZ.

For X-ray diffraction (XRD) measurement of the crystal phase of ceria-zirconia-based composite oxide with the use of CuKα, the diffraction line of 2θ=14.5° is a diffraction line derived from the (111) plane of the regular phase (κ phase), and the diffraction line of 2θ=29° is formed when a diffraction line derived from the (222) plane of the regular phase and a diffraction line derived from the (111) plane of a ceria-zirconia solid solution having no pyrochlore phase are superimposed. Therefore, the I (14/29) value corresponding to the strength ratio of the both diffraction lines can be designated as an indicator of the abundance of the regular phase. In the exemplary embodiments, XRD measurement is usually carried out after heating of ceria-zirconia-based composite oxide serving as a measurement subject at 1100° C. for 5 hours in the atmosphere (high temperature durability test). In the exemplary embodiments, the I (14/29) value corresponding to the strength ratio between the diffraction line of 2θ=14.5° and the diffraction line of 2θ=29°, which is calculated based on an X-ray diffraction pattern using CuKα obtained via X-ray diffraction measurement after heating of ceria-zirconia-based composite oxide in the atmosphere at 1100° C. for 5 hours, is preferably, 0.017 or more from the viewpoints of maintenance of the favorable regular phase and oxygen storage capacity after the durability test. It is possible to calculate a complete κ phase I (14/29) value of 0.04 and a complete pyrochlore phase I (14/29) value of 0.05 based on a PDF card (PDF2:01-070-4048) for the κ phase and a PDF card (PDF2:01-075-2694) for the pyrochlore phase. In addition, upon XRD measurement using CuKα of the crystal phase of ceria-zirconia-based composite oxide, the diffraction line of 2θ=28.5° is a diffraction line derived from the (111) plane of $CeO_2$ itself. Therefore, the I (28/29) value corresponding to the strength ratio between the diffraction line of 2θ=28.5° and the diffraction line of 2θ=29° can be designated as an indicator representing the degree of phase splitting of $CeO_2$ from the composite oxide. In the exemplary embodiments, the I (28/29) value corresponding to the strength ratio between the diffraction line of 2θ=28.5° and the diffraction line of 2θ=29°, which is calculated based on an X-ray diffraction pattern using CuKα obtained via X-ray diffraction measurement after heating of ceria-zirconia-based composite oxide in the atmosphere at 1100° C. for 5 hours, is preferably 0.05 or less from the viewpoints of inhibition of phase splitting of ceria and oxygen storage capacity after the durability test.

The secondary particle size (D50) of ceria-zirconia-based composite oxide having a pyrochlore structure is from 3 μm to 7 μm, preferably from 3 μm to 6 μm, and more preferably from 3 μm to 5 μm. When the secondary particle size (D50) of pyrochlore CZ falls within such range, it is possible to significantly increase the oxygen absorption/release rate while having sufficient heat resistance and maintaining the oxygen storage volume at high levels, compared with pyrochlore CZ having a secondary particle size (D50) that does not fall within the range. In addition, ceria-zirconia-based composite oxide having a fluorite structure does not have such relationship between the secondary particle size and the oxygen absorption/release rate. Therefore, pyrochlore CZ has a specific feature of having a significantly improved oxygen absorption/release rate when having the secondary particle size (D50) within a particular range, which is an unexpected effect. The secondary particle size has a large impact on pyrochlore CZ probably because pyrochlore CZ is characterized by rapid internal oxygen diffusion, which is particular to a pyrochlore structure. Meanwhile, heat resistance having a trade-off relationship with the oxygen absorption/release rate exhibits different sensitivity to the secondary particle size from the oxygen absorption/release rate, resulting in maintenance of sufficiently high heat resistance. As a result, it was possible to significantly increase the oxygen absorption/release rate while achieving high heat resistance and maintaining the oxygen storage volume at high levels because the secondary particle size (D50) of pyrochlore CZ was set within a certain range. Accordingly, in the exemplary embodiments, when pyrochlore CZ has a secondary particle size (D50) of 3 μm to 7 μm, it is possible to achieve a favorable balance between the oxygen storage volume and the oxygen absorption/release rate while realizing sufficient heat resistance, and in particular, significantly increase the oxygen absorption/release rate.

According to the exemplary embodiments, the term "secondary particle" refers to an aggregation of primary particles, and the term "primary particles" generally refers to the smallest particles that constitute a powder. Primary particles can be determined via observation using an electron microscope such as a scanning electron microscope. In the exemplary embodiments, the primary particle size of pyrochlore CZ is usually smaller than the secondary particle size. The primary particle size (D50) is preferably from 1.5 μm to 6.0 μm and more preferably from 1.70 μm to 5.0 μm. The term "primary particle size (D50)" used herein refers to the average primary particle size upon determination of particle number distribution. Meanwhile, the term "secondary particle size (D50)" used in the exemplary embodiments means that the secondary particle size corresponds to the particle size at 50% in the cumulative distribution (also referred to as "median size" or "D50"). The secondary particle size (D50) is a particle size at 50% of a cumulative volume distribution curve (i.e., particle size at 50% in the cumulative distribution on a volumetric basis) when the total volume is 100% for the particle size distribution on a volumetric basis obtained via measurement by the laser diffraction scattering method.

Pyrochlore CZ having a secondary particle size (D50) within a particular range can be obtained by, for example, mixing starting materials to obtain a precipitate, drying and calcining the obtained precipitate, pulverizing the resulting product to obtain a powder, conducting pressure molding of the obtained powder, subjecting the molded body to reduction treatment, and pulverizing the obtained product to result in a predetermined secondary particle size (D50). The molded body can be pulverized using, for example, a ball mill, a vibration mill, a stream mill, a pin mill, or the like.

The molar ratio (Zr/Ce) between zirconium (Zr) and cerium (Ce) of pyrochlore CZ is 1.13<Zr/Ce<1.30.

Pyrochlore CZ may contain praseodymium (Pr), and it preferably contains praseodymium, in addition to cerium and zirconium. A praseodymium reduction reaction is expressed by $Pr_6O_{11} \rightarrow 3Pr_2O_3 + O_2$ where ΔG (Gibbs free energy) is negative, and therefore, praseodymium is considered to facilitate a $CeO_2$ reduction reaction expressed by $2CeO_2 \rightarrow Ce_2O_3 + 0.5O_2$ where ΔG is positive. When pyrochlore CZ contains praseodymium, pyrochlore CZ preferably contains praseodymium at 0.5 mol % to 5 mol % based on the total amount of positive ions, and the molar ratio between Zr and (Ce+Pr) is preferably 1.13<Zr/(Ce+Pr)<1.30.

Pyrochlore CZ may contain additional elements other than praseodymium (Pr), in addition to cerium (Ce) and zirconium (Zr). Examples of additional elements other than praseodymium include, but are not particularly limited to, rare-earth elements other than cerium and praseodymium and alkaline-earth metals. Examples of rare-earth elements other than cerium and praseodymium include scandium (Sc), yttrium (Y), lanthanum (La), neodymium (Nd), samarium (Sm), gadolinium (Gd), terbium (Tb), dysprosium (Dy), ytterbium (Yb), and lutetium (Lu). Of these, La, Nd, Y, and Sc are preferable in view of the tendency that when they carry noble metals, interaction between them and noble metals is intensified, resulting in an increase in affinity. In addition, examples of alkaline-earth metal elements include magnesium (Mg), calcium (Ca), strontium (Sr), barium (Ba), and radium (Ra). Of these, Mg, Ca, and Ba are preferable in view of the tendency that when they carry noble metals, interaction between them and noble metals is intensified, resulting in an increase in affinity. The content of additional elements is usually 5 mol % or less based on the total amount of positive ions of pyrochlore CZ.

The specific surface area of pyrochlore CZ is preferably 5 $m^2$/g or less from the viewpoints of favorable interaction with noble metals, oxygen storage capacity, and heat resistance. The specific surface area can be calculated as the BET specific surface area from an adsorption isotherm using the BET isotherm adsorption equation.

The tap density of pyrochlore CZ is preferably from 1.5 g/cc to 2.5 g/cc.

As a catalyst metal used for the catalyst coating layer, any catalyst metal that shows catalyst activity upon CO or HC oxidation and/or NOx reduction, which is, for example, a platinum-group noble metal, can be used. Examples of platinum-group noble metals include ruthenium (Ru), rhodium (Rh), palladium (Pd), osmium (Os), iridium (Ir), and platinum (Pt). It is particularly preferable to use Rh, Pt, and Pd. The amount of the catalyst metal to be carried on a support may be similar to that of a conventional catalyst for purifying exhaust gas; however, it is preferably from 0.01% to 5% by weight of the amount of a catalyst for purifying exhaust gas. Pyrochlore CZ may be used as a support for carrying a catalyst metal in the catalyst coating layer. In addition, the catalyst coating layer may contain, as a support, a support material other than pyrochlore CZ. Examples of a support material other than pyrochlore CZ that can be used include any metal oxides used as a catalyst support in general, such as, alumina ($Al_2O_3$), ceria ($CeO_2$), zirconia ($ZrO_2$), silica ($SiO_2$), titania ($TiO_2$), lantana ($La_2O_3$), and a combination thereof. A general catalyst supporting method such as an impregnation method, an adsorption method, or a water absorption method for catalyst supporting can be used.

The catalyst for purifying exhaust gas contains pyrochlore CZ in an amount of 5 to 100 g/L based on the substrate volume in the catalyst coating layer from the viewpoint of a favorable balance between the effect of improving the oxygen absorption/release rate and exhaust gas purification capacity, which is realized in accordance with the amount of the catalyst to be used.

The catalyst for purifying exhaust gas has at least one catalyst coating layer and preferably two catalyst coating layers which are upper and lower layers. In preferable embodiments, the catalyst for purifying exhaust gas has a substrate, a lower catalyst coating layer that is formed on the substrate, and an upper catalyst coating layer comprising pyrochlore CZ that is formed on the lower catalyst coating layer.

In embodiments in which the catalyst for purifying exhaust gas has two catalyst coating layers, it is preferable that the lower catalyst coating layer comprises a combination of palladium (Pd) as a catalyst metal, a support such as alumina ($Al_2O_3$), and a composite oxide of alumina ($Al_2O_3$), ceria ($CeO_2$), zirconia ($ZrO_2$), and lantana ($La_2O_3$), and the upper catalyst coating layer comprises a combination of rhodium (Rh) as a catalyst metal, a support such as pyrochlore CZ, alumina ($Al_2O_3$), and a composite oxide of alumina ($Al_2O_3$), ceria ($CeO_2$), zirconia. ($ZrO_2$), and lantana ($La_2O_3$). In such case, it is preferable for the catalyst metal to be carried by a composite oxide of alumina ($Al_2O_3$), ceria ($CeO_2$), zirconia ($ZrO_2$), and lantana ($La_2O_3$).

A substrate used for the catalyst for purifying exhaust gas is not particularly limited and a generally used honeycomb-shaped material having many cells can be used. Examples of the material include cordierite ($2MgO.2Al_2O_3.5SiO_2$), ceramics material having heat resistance such as alumina, zirconia, or silicon carbide, and metal material comprising metal foil of stainless steel or the like. Coating of a substrate with a catalyst coating layer can be carried out by a known technique of, for example, pouring slurry that has been prepared by suspending materials in distilled water and a binder into a substrate and blowing off an unnecessary portion of the slurry using a blower.

The catalyst for purifying exhaust gas of the exemplary embodiments can be used for a catalyst system for purifying exhaust gas containing two or more catalysts. Preferably, the catalyst for purifying exhaust gas of the exemplary embodiments is used for a catalyst system for purifying exhaust gas containing two catalysts, which are a start-up catalyst (also referred to as, for example, "S/C" or "start-up convertor") which is attached immediately under an internal combustion engine and an underfloor catalyst (also referred to as, for example, "UF/C," "underfloor convertor," or "underfloor catalyst") which is disposed downstream from the S/C along the flow direction of exhaust gas. Specifically, the catalyst for purifying exhaust gas of the exemplary embodiments can be used as S/C and/or UF/C for a catalyst system for purifying exhaust gas containing S/C and UF/C.

Start-Up Catalyst (S/C)

When the catalyst for purifying exhaust gas of the exemplary embodiments is used as S/C, it is preferable that S/C has at least two catalyst coating layers multilayer catalyst coating), and at least one catalyst coating layer comprises pyrochlore CZ described above. Preferably, S/C has two catalyst coating layers, which are upper and lower layers. Preferable examples of a catalyst metal used for catalyst coating layers of S/C are those described above for the catalyst for purifying exhaust gas. More preferably, the uppermost catalyst coating layer of S/C contains Rh and Pd as catalyst metals, and at least one layer other than the uppermost layer contains Pd as a catalyst metal.

S/C Having the Uppermost Layer of a Multilayer Catalyst Coating that Contains Pyrochlore CZ In one embodiment, the uppermost catalyst coating layer of S/C contains pyrochlore CZ. In preferable aspects, the upper layer of two catalyst coating layers that are upper and lower layers contains pyrochlore CZ. In such case, a catalyst coating layer of S/C, which is other than the uppermost layer, may or may not contain pyrochlore CZ. In such embodiment, S/C contains pyrochlore CZ in the uppermost layer that is easily brought into contact with exhaust gas, thereby making it possible to quickly allow OSC to be expressed in response to a slight atmospheric variation in the exhaust gas so as to maintain the catalyst in the stoichiometric atmosphere for a long period of time. Further, as a small amount of pyrochlore CZ can exert sufficient OSC performance, it becomes possible to downsize the catalyst without causing an increase in pressure loss of the catalyst.

In this embodiment, the uppermost catalyst coating layer of S/C preferably contains pyrochlore CZ in an amount of 5 to 50 g/L based on the substrate volume. When the uppermost catalyst coating layer of S/C contains pyrochlore CZ in an amount of 5 g/L or more based on the substrate volume, S/C has sufficient OSC performance and high NOx purification capacity (catalyst activity), and when it contains pyrochlore CZ in an amount of 50 g/L or less, S/C has high OSC performance and sufficient NOx purification capacity.

It is preferable to use S/C in the above embodiment under conditions in which, for example, A/F is controlled in the vicinity of the stoichiometric range in an internal combustion engine at 400° C. or higher.

In preferable embodiments, S/C has at least two catalyst coating layers, the uppermost catalyst coating layer comprises Rh and Pd as catalyst metals, pyrochlore CZ that is contained in an amount of 5 to 50 g/L based on the substrate volume, and other support materials, and at least one layer other than the uppermost layer comprises a Pd as a catalyst metal and a support material other than pyrochlore CZ.

In further preferable embodiments, S/C has two catalyst coating layers which are upper and lower layers, the upper catalyst coating layer comprises Rh and Pd as catalyst metals, pyrochlore CZ that is contained in an amount of 5 to 50 g/L based on the substrate volume, and other support materials, and the lower catalyst coating layer comprises a Pd as a catalyst metal and a support material other than pyrochlore CZ.

S/C Containing Pyrochlore CZ in a Layer Other than the Uppermost Layer of the Multilayer Catalyst Coating In other embodiments, S/C contains pyrochlore CZ in at least one layer other than the uppermost catalyst coating layer. In preferable aspects, S/C contains pyrochlore CZ in the lower layer of two catalyst coating layers that are an upper layer and a lower layer. In such case, the uppermost layer of S/C may or may not contain pyrochlore CZ. In this embodiment, S/C contains pyrochlore CZ in a layer other than the uppermost layer, thereby making it possible to achieve both high NOx purification capacity during the steady operation and high NOx purification capacity upon A/F switching. In particular, high NOx purification capacity is achieved at low temperatures at which such effects are unlikely to be obtained using conventional OSC materials. This embodiment is useful for reduction of NOx emission during mode traveling.

In the above embodiment, S/C preferably contains pyrochlore CZ in an amount of 5 to 30 g/L based on the substrate volume in at least one layer other than the uppermost catalyst coating layer. When S/C contains pyrochlore CZ in an amount of 5 to 30 g/L based on the substrate volume in at least one layer other than the uppermost catalyst coating layer, high NOx purification capacity during the steady operation and high NOx purification capacity upon A/F switching can be achieved at the same time.

It is preferable to use S/C in the above embodiment under conditions in which, for example, A/F is controlled in the vicinity of the stoichiometric range in an internal combustion engine at 400° C. or higher.

In preferable embodiments, S/C has at least two catalyst coating layers. The uppermost catalyst coating layer comprises Rh and Pd as catalyst metals and support materials other than pyrochlore CZ, and at least one layer other than the uppermost layer comprises a Pd as a catalyst metal, pyrochlore CZ in an amount of 5 to 30 g/L based on the substrate volume, and support materials other than pyrochlore CZ.

In further preferable embodiments, S/C has two catalyst coating layers which are upper and lower layers. The upper catalyst coating layer comprises Rh and Pd as catalyst metals and support materials other than pyrochlore CZ, and the lower catalyst coating layer comprises Pd as a catalyst metal, pyrochlore CZ that is contained in an amount of 5 to 30 g/L based on the substrate volume, and a support material other than pyrochlore CZ.

Underfloor Catalyst (UF/C)

UF/C is disposed downstream of S/C. Since an exhaust gas used for the reaction in S/C enters UF/C, UF/C purifies an exhaust gas especially HC that cannot be fully purified in S/C in an atmosphere of the exhaust gas containing less oxygen.

When the catalyst for purifying exhaust gas of the exemplary embodiments is used as UF/C, UF/C has at least two catalyst coating layers and it preferably contains pyrochlore CZ in the uppermost catalyst coating layer. A catalyst coating layer other than uppermost layer of UF/C may or may not contain pyrochlore CZ. UF/C preferably has two catalyst coating layers, which are upper and lower layers, and contains pyrochlore CZ in the upper layer. In such embodiment, UF/C contains pyrochlore CZ in the uppermost layer that is easily brought into contact with exhaust gas, thereby causing an increase in HC purification capacity during the steady operation. Further, as a small amount of pyrochlore CZ shows sufficient HC purification capacity, it becomes possible to downsize the catalyst without causing an increase in pressure loss of the catalyst. Preferable examples of a catalyst metal used for catalyst coating layers of UF/C are those described above for the catalyst for purifying exhaust gas. It is more preferable that the uppermost catalyst coating layer of UF/C contains Rh as a catalyst metal, and at least one layer other than the uppermost layer contains Pd as a catalyst metal.

UF/C preferably contains pyrochlore CZ in an amount of 5 to 20 g/L based on the substrate volume in the uppermost catalyst coating layer. When UF/C contains pyrochlore CZ in an amount of 5 to 20 g/L based on the substrate volume in the uppermost catalyst coating layer, high HC purification capacity and high NOx purification capacity during the steady operation can be achieved at the same time.

It is preferable to use UF/C in the above embodiment under conditions in which, for example, A/F is controlled in the vicinity of the stoichiometric range in an internal combustion engine at 350° C. or higher.

In preferable embodiments, UF/C has at least two catalyst coating layers. The uppermost catalyst coating layer comprises Rh as a catalyst metal, pyrochlore CZ in an amount of 5 to 20 g/L based on the substrate volume, and other support materials, and at least one layer other than the uppermost layer comprises a Pd as a catalyst metal and support materials other than pyrochlore CZ.

In further preferable embodiments, UF/C has two catalyst coating layers which are upper and lower layers. The upper catalyst coating layer comprises Rh as a catalyst metal, pyrochlore CZ in an amount of 5 to 20 g/L based on the substrate volume, and other support materials, and the lower catalyst coating layer comprises a Pd as a catalyst metal and support materials other than pyrochlore CZ.

EXAMPLES

Exemplary embodiments are more specifically described below with reference to the Examples. However, the scope of the exemplary embodiments is not limited to the Examples.

Preparation of Ceria-Zirconia-Based Composite Oxide (1) Synthesis of Praseodymium-Containing Pyrochlore-Type Ceria-Zirconia-Based Composite Oxide (Pr-Containing Pyrochlore CZ)

Cerium nitrate hexahydrate (129.7 g), zirconium oxynitrate dihydrate (99.1 g), praseodymium nitrate hexahydrate (5.4 g), and an 18% hydrogen peroxide solution (36.8 g) were dissolved in ion-exchange water (500 cc). A hydroxide precipitate was obtained from the resulting solution via reverse coprecipitation using 25% ammonia water (340 g). The precipitate was separated using filter paper. The obtained precipitate was dried in a drying furnace at 150° C. for 7 hours so as to remove moisture, calcined in an electric furnace at 500° C. for 4 hours, and pulverized. Thus, a ceria-zirconia-praseodymia composite oxide was obtained.

Next, the obtained powder was molded by applying a pressure of 2000 kgf/cm$^2$ using a compacting machine (Wet-CIP). Thus, a molded body of the ceria-zirconia-praseodymia composite oxide was obtained.

Next, the obtained molded body was reduced in a graphite crucible containing activated carbon in an Ar atmosphere at 1700° C. for 5 hours. Accordingly, a praseodymium-containing pyrochlore-type ceria-zirconia-based composite oxide (Pr-containing pyrochlore CZ) was prepared. The obtained Pr-containing pyrochlore CZ was then calcined in an electric furnace at 500° C. for 5 hours.

(2) Synthesis of Praseodymium-Containing Fluorite-Type Ceria-Zirconia-Based Composite Oxide (Pr-Containing Fluorite CZ)

Cerium nitrate hexahydrate (129.7 g), zirconium oxynitrate dihydrate (99.1 g), praseodymium nitrate hexahydrate (5.4 g), and an 18% hydrogen peroxide solution (36.8 g) were dissolved in ion-exchange water (500 cc). A hydroxide precipitate was obtained from the resulting solution via reverse coprecipitation using 25% ammonia water (340 g). The precipitate was separated using filter paper. The obtained precipitate was dried in a drying furnace at 150° C. for 7 hours so as to remove moisture and calcined in an electric furnace at 900° C. for 5 hours. Accordingly, a praseodymium-containing fluorite-type cerin-zirconia-based composite oxide (Pr-containing fluorite CZ) was obtained.

Example 1

Pr-containing pyrochlore CZ (200 g/batch) was pulverized using a vibration mill by setting pulverization conditions so as to adjust the secondary particle size (D50) to 3 μm. Thus, Pr-containing pyrochlore CZ having a secondary particle size (D50) of 3.3 μm was prepared in Example 1.

Example 2

Pr-containing pyrochlore CZ (200 g/batch) was pulverized using a stream mill by setting pulverization conditions so as to adjust the secondary particle size (D50) to 5 μm. Thus, Pr-containing pyrochlore CZ having a secondary particle size (D50) of 4.9 μm was prepared in Example 2.

Comparative Example 1

Pr-containing pyrochlore CZ (200 g/batch) was pulverized using a vibration mill by setting pulverization conditions so as to adjust the secondary particle size (D50) to 1 μm. Thus, Pr-containing pyrochlore CZ having a secondary particle size (D50) of 0.5 μm was prepared in Comparative Example 1.

Comparative Example 2

Pr-containing pyrochlore CZ (200 g/batch) was pulverized using a stream mill by setting pulverization conditions so as to adjust the secondary particle size (D50) to 11 μm. Thus, Pr-containing pyrochlore CZ having a secondary particle size (D50) of 11.2 μm was prepared in Comparative Example 2.

Comparative Example 3

Pr-containing fluorite CZ (200 g/batch) was pulverized using a vibration mill by setting pulverization conditions so as to adjust the secondary particle size (D50) to 1 μm. Thus, Pr-containing fluorite CZ having a secondary particle size (D50) of 1.0 μm was prepared in Comparative Example 3.

Comparative Example 4

Pr-containing fluorite CZ (200 g/batch) was pulverized using a stream mill by setting pulverization conditions so as to adjust the secondary particle size (D50) to 5 μm. Thus, Pr-containing fluorite CZ having a secondary particle size (D50) of 5.1 μm was prepared in Comparative Example 4.

Comparative Example 5

Pr-containing fluorite CZ (200 g/batch) was pulverized using a stream mill by setting pulverization conditions so as to adjust the secondary particle size (D50) to 8 μm. Thus, Pr-containing fluorite CZ having a secondary particle size (D50) of 10.9 μm was prepared in Comparative Example 5.

Evaluation of Ceria-Zirconia-Based Composite Oxide

X-ray Diffraction (XRD) Measurement

The ceria-zirconia-based composite oxides obtained in Examples 1 and 2 and Comparative Examples 1 to 5 were heat-treated in the atmosphere at 1100° C. for 5 hours (high-temperature durability test) The crystal phase of each ceria-zirconia-based composite oxide after the treatment was subjected to X-ray diffraction measurement. X-ray diffraction patterns were determined using TTR-III (Rigaku Corporation) as an X-ray diffraction equipment, thereby obtaining the I (14/29) value and the I (28/29) value. Table 1 shows the results obtained for the ceria-zirconia-based composite oxides of Examples 1 and 2 and Comparative Examples 1 and 2.

TABLE 1

| | I (14/29) value | I (28/29) value | D50 (μm) |
|---|---|---|---|
| Example 1 | 0.0359 | 0.0072 | 3.3 |
| Example 2 | 0.0368 | 0.0088 | 4.9 |
| Comparative Example 1 | 0.038 | 0.0243 | 0.5 |
| Comparative Example 2 | 0.0371 | 0.0071 | 11.2 |
| Comparative Example 3 | — | — | 1.0 |
| Comparative Example 4 | — | — | 5.1 |
| Comparative Example 5 | — | — | 10.9 |

Table 1 shows that the I (14/29) values of the ceria-zirconia-based composite oxides of Examples 1 and 2 and Comparative Examples 1 and 2 were substantially equal. This indicates that the secondary particle size (D50) of pyrochlore CZ has a small impact on heat resistance, and therefore, the ceria-zirconia-based composite oxides of Examples 1 and 2 have sufficient heat resistance.

<Oxygen Storage Capacity Measurement Test: OSC Evaluation>

Oxygen storage capacity (OSC) was measured in the manner described below for the ceria-zirconia-based composite oxides obtained in Examples 1 and 2 and Comparative Examples 1 to 5.

In a durability test, heat treatment was conducted at 1050° C. for 5 hours, and the gas composition during the durability test was switched between 8%—CO+10%—$H_2O$ and 20%—$O_2$+10%—$H_2O$ at 15-minute intervals.

Further, each of the cerin-zirconia-based composite oxides of Examples 1 and 2 and Comparative Examples 1 to 5 after the durability test and a Pd-carrying (0.25% by weight) Pd/Al$_2$O$_3$ powder were physically mixed at a weight ratio of 1:1. Each obtained powder was molded by applying a pressure of 1000 kgf/cm$^2$ using a compacting machine (Wet-CIP equipment), pulverized, and sieved, thereby producing 1-mm cubic pellets.

The pellets (3.0 g) were placed in a fixed-bed flow reactor and tested using a gas for evaluation at a total flow rate of 15 L. The O$_2$ released from each ceria-zirconia-based composite oxide was calculated from the amount of CO$_2$ generated in the initial period (0 to 13 seconds) in the 2%—CO (N$_2$ balanced) flow after 1%—O$_2$ (N$_2$ balance) treatment based on the reaction formula (CO+½→CO$_2$) so as to obtain the initial oxygen storage capacity (OSC), thereby evaluating the oxygen absorption/release rate. Note that release of oxygen from cerium is expressed by the following reaction formula: $2CeO_2 \rightarrow Ce_2O_3 + ½O_2$.

FIG. 1 shows the results. FIG. 1 shows the initial oxygen storage capacity (OSC) (bar graph) of each of the ceria-zirconia-based composite oxides in Examples 1 and 2 and Comparative Examples 1 to 5 and the maximum oxygen storage amount (Cmax) (line graph) of each of catalysts for purifying exhaust gas obtained using these composite oxides. FIG. 1 (bar graph) shows that the initial oxygen storage capacity (OSC) do not increase and remains at a substantially constant level even under the control of the secondary particle size for the ceria-zirconia-based composite oxides having a fluorite structure (Comparative Examples 3 to 5), while on the other hand, the initial oxygen storage capacity (OSC) significantly increases and the oxygen absorption/release rate significantly improves for the ceria-zirconia-based composite oxides having a pyrochlore structure (Examples 1 and 2 and Comparative Examples 1 and 2) when the secondary particle size (D50) is set within a specific range.

<Engine Bench Evaluation>

Catalyst for purifying exhaust gas were prepared using the ceria-zirconia-based composite oxides of Examples 1 and 2 and Comparative Examples 1 to 5 and evaluated.

(1) Preparation of Catalysts

The following materials were used as materials for catalysts.

Ceria-zirconia-based composite oxides of Examples 1 and 2 and Comparative Examples 1 to 5

Al$_2$O$_3$: Composite of Al$_2$O$_3$ and La$_2$O$_3$ (1% by weight)

ACZL: Composite oxide of Al$_2$O$_3$ (30% by weight), CeO$_2$ (20% by weight), ZrO$_2$ (45% by weight), and La$_2$O$_3$ (5% by weight)

Rh: Rhodium (Rh) nitrate aqueous solution with a noble metal content of 2.75% by weight (Cataler Corporation)

Pd: Palladium (Pd) nitrate aqueous solution with a noble metal content of 8.8% by weight (Cataler Corporation)

Honeycomb substrate: 875-cc (600H/3-9R-08) cordierite honeycomb substrate (Denso Corporation)

Catalysts were prepared in the manner described below.

(a) Lower layer: Pd (0.69)/ACZL (45)+Al$_2$O$_3$ (40) (the figure in each pair of parentheses represents the coating amount (g/L) based on the substrate volume)

Pd/ACZL, in which PD was carried by ACZL, was prepared using ACZL and palladium nitrate by the impregnation method and suspended in distilled water. Al$_2$O$_3$ and an Al$_2$O$_3$-based binder were added thereto. Thus, slurry was prepared. The prepared slurry was poured into a substrate and an unnecessary portion thereof was blown off using a blower so that the substrate wall face was coated. The coating was adjusted to contain Pd at 0.69 g/L Al$_2$O$_3$ at 40 g/L, and ACZL at 45 g/L based on the substrate volume. The coating was dried using a dryer maintained at 120° C. for 2 hours and calcined in an electric furnace at 500° C. for 2 hours. Thus, the lower-layer coating was made.

(b) Upper layer: Rh (0.10)/ACZL (110)+Al$_2$O$_3$ (28)+ceria-zirconia-based composite oxide (20) in Examples 1 and 2 and Comparative Examples 1 to 5

Rh/ACZL, in which Rh was carried by ACZL, was prepared using ACZL and rhodium nitrate by the impregnation method and suspended in distilled water. Al$_2$O$_3$ and an Al$_2$O$_3$-based binder were added thereto during stirring. At the end, each of the ceria-zirconia-based composite oxides of Examples 1 and 2 and Comparative Examples 1 to 5 was separately added thereto. Thus, slurry corresponding to each relevant composite oxide was prepared. Each obtained slurry was poured into the substrate prepared by coating in (a) above and an unnecessary portion thereof was blown off using a blower so that the substrate wall face was coated. The coating was adjusted to contain Rh at 0.10 g/L, Al$_2$O$_3$ at 28 g/L, ACZL at 110 g/L, and any of the ceria-zirconia-based composite oxides in Examples 1 and 2 and Comparative Examples 1 to 5 at 20 g/L based on the substrate volume. The coating was dried using a dryer maintained at 120° C. for 2 hours and calcined in an electric furnace at 500° C. for 2 hours. Accordingly, catalysts for Examples 1 and 2 and Comparative Examples 1 to 5 were obtained using the corresponding ceria-zirconia-based composite oxides of Examples 1 and 2 and Comparative Examples 1 to 5.

(2) Durability Test

The accelerated deterioration test was implemented using a 1UR-FE engine (Toyota Motor Corporation) at a catalyst bed temperature of 1000° C. for 25 hours. The throttle opening angle and the engine load were adjusted so as to accelerate deterioration of the exhaust gas composition by repeatedly switching rich, stoichiometric, and lean atmospheres in a certain cycle.

(3) OSC Test

Figure 2:
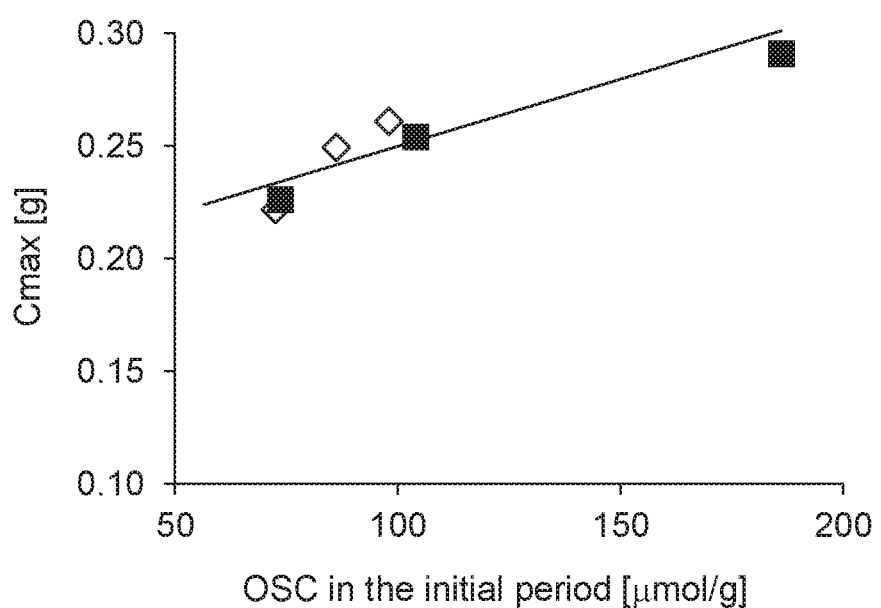
FIG. 2 shows the relationship between the oxygen storage capacity (OSC) in the initial period (0 to 13 seconds) and the maximum oxygen storage amount (Cmax).

Each of the catalysts examined in the durability test in (2) above was attached to a 2AZ-FE engine (Toyota Motor Corporation). The inlet gas temperature was set to 600° C. A/F of the inlet gas atmosphere was feedback-controlled to target levels of 14.1 and 15.1 for periodical vibration. Excess or deficiency in oxygen was calculated based on a difference between the stoichiometric point and the A/F sensor output by the following equation: OSC (g)=0.23×ΔA/F×ejected fuel amount. Thus, the maximum oxygen storage amount (Cmax) was obtained. It is known that there is a correlation between the oxygen storage capacity (OSC) in the initial period (0 to 13 seconds) and the maximum oxygen storage amount (Cmax) of a catalyst, and thus, when the oxygen storage capacity (OSC) in the initial period (0 to 13 seconds) is large, the maximum oxygen storage amount (Cmax) becomes large (see FIG. 2). Therefore, the oxygen absorption/release rate can be evaluated by obtaining the maximum oxygen storage amount (Cmax) of a catalyst. FIG. 1 shows the results. FIG. 1 shows the oxygen storage capacity (OSC) in the initial period (bar graph) for the ceria-zirconia-based composite oxides of Examples 1 and 2 and Comparative Examples 1 to 5 and the maximum oxygen storage amount (Cmax) (line graph) for catalysts for purifying exhaust gas obtained using these composite oxides.

It was confirmed from FIG. 1 that the engine bench evaluation results obtained for catalysts containing the ceria-zirconia-based composite oxides of Examples 1 and 2 and Comparative Examples 1, 2, and 4 were similar to the results obtained for the ceria-zirconia-based composite oxides of Examples 1 and 2 and Comparative Examples 1 to 5. Specifically, FIG. 1 (line graph) shows that when the secondary particle size (D50) of a ceria-zirconia-based composite oxide having a pyrochlore structure was set within a certain range (3 μm to 7 μm), the maximum oxygen storage amount (Cmax) thereof significantly increased, compared with pyrochlore CZ the secondary particle size of which did not fall within the range and a ceria-zirconia-based composite oxide having a fluorite structure, thereby resulting in a significant increase in the oxygen absorption/release rate in the exemplary embodiments. The secondary particle size has a large impact on pyrochlore CZ probably because pyrochlore CZ is characterized by rapid internal oxygen diffusion, which is particular to a pyrochlore structure. Meanwhile, heat resistance having a trade-off relationship with the oxygen absorption/release rate exhibits different sensitivity to the secondary particle size from the oxygen absorption/release rate, resulting in maintenance of sufficiently high heat resistance. As a result, it was possible to significantly increase the oxygen absorption/release rate while achieving high heat resistance and maintaining the oxygen storage volume at high levels because the secondary particle size (D50) of pyrochlore CZ was set within a certain range.

It is possible to obtain a ceria-zirconia-based composite oxide having a pyrochlore structure, which is capable of achieving sufficient heat resistance and realizing a favorable balance between the oxygen storage volume and the oxygen absorption/release rate by setting the secondary particle size (D50) to 3 μm to 7 μm. A catalyst for purifying exhaust gas comprising such ceria-zirconia-based composite oxide also has the same effects.

<Start-Up Catalyst (S/C)>

The following materials were used as materials for catalysts $Al_2O_3$: Composite of $Al_2O_3$ and $La_2O_3$ (4% by weight) (Sasol)

ACZ-1: Composite oxide of $Al_2O_3$ (30% by weight), $CeO_2$ (27% by weight), $ZrO_2$ (35% by weight), $La_2O_3$ (4% by weight), and $Y_2O_3$ (4% by weight) (Solvay)

ACZ-2: Composite oxide of $Al_2O_3$ (30% by weight), $CeO_2$ (20% by weight), $ZrO_2$ (44% by weight), $Nd_2O_2$ (2% by weight), $La_2O_3$ (2% by weight), and $Y_2O_3$ (2% by weight) (Daiichi Kigenso Kagaku Kogyo Co., Ltd.)

OSC Material:

Ceria-zirconia-based composite oxide (Pr-containing pyrochlore CZ) of any one of Example 2 and Comparative Examples 1 and 2

ACZ-2 described above

CZ: Composite oxide of $CeO_2$ (30% by weight), $ZrO_2$ (60% by weight), $La_2O_3$ (5% by weight), and $Y_2O_3$ (5% by weight) (Solvay)

Fluorite-type CZ: Pr-containing fluorite CZ having a secondary particle size (D50) of 6.1 μm prepared in the same manner as in Comparative Example 4

Honeycomb substrate: 875-cc cordierite honeycomb substrate (having 600 hexagonal cells with a wall thickness of 2 mil)

In order to evaluate performance of S/C, in which the ceria-zirconia-based composite oxide of the exemplary embodiments was added as an OSC material to the uppermost layer, S/C was prepared in the manner described below in Examples 3 to 7 and Comparative Examples 6 to 11.

Comparative Example 6

(a) Preparation of the Lower-Layer Coating

Pd/ACZ-1, in which Pd was carried by ACZ-1, was prepared using ACZ-1 and palladium nitrate by the impregnation method. Certain amounts of Pd/ACZ-1. $Al_2O_3$, barium sulfate, and an $Al_2O_3$-based binder were added to distilled water during stirring and suspended therein. Thus, slurry 1 was prepared. The prepared slurry 1 was poured into a substrate and an unnecessary portion thereof was blown off using a blower so that the substrate wall face was coated. The coating was adjusted to contain Pd at 0.38 g/L, $Al_2O_3$ at 40 g/L, ACZ-1 at 45 g/L, and barium sulfate at 5 g/L based on the substrate volume. The coating was dried using a dryer maintained at 120° C. for 2 hours and calcined in an electric furnace at 500° C. for 2 hours. Thus, the lower-layer coating was made.

(b) Preparation of the Upper-Layer Coating

Rh/ACZ-2, in which Rh was carried by ACZ-2, was prepared using ACZ-2 and rhodium nitrate by the impregnation method. Certain amounts of palladium nitrate, Rh/ACZ-2, $Al_2O_3$, and an $Al_2O_3$-based binder were added to distilled water during stirring and suspended therein. Thus, slurry 2 was prepared. The obtained slurry 2 was poured into the substrate prepared by coating in (a) above and an unnecessary portion thereof was blown off using a blower so that the substrate wall face was coated. The coating was adjusted to contain Rh at 0.3 g/L, Pd at 0.2 g/L, ACL-2 at 72 g/L, and $Al_2O_3$ at 63 g/L based on the substrate volume. The coating was dried using a dryer maintained at 120° C. for 2 hours and calcined in an electric furnace at 500° C. for 2 hours. Thus, S/C, in which the upper-layer coating was formed on the lower-layer coating, was obtained.

Examples 3-6

S/C was obtained in the same manner as in Comparative Example 6 except that the ceria-zirconia-based composite oxide (Pr-containing pyrochlore CZ) of Example 2 was added as an OSC material to slurry 2 for forming the upper-layer coating so that the coating amount was adjusted to 16 g/L, 24 g/L, 48 g/L, and 55 g/L based on the substrate volume in Examples 3, 4, 5 and 6, respectively.

Example 7

S/C was obtained in the same manner as in Comparative Example 6 except that the ceria-zirconia-based composite oxide of Example 2 was added as an OSC material to slurry 1 for forming the lower-layer coating so that the coating amount was adjusted to 24 g/L based on the substrate volume.

Comparative Example 7

S/C was obtained in the same manner as in Comparative Example 6 except that the ceria-zirconia-based composite oxide (Pr-containing pyrochlore CZ) of Comparative Example 2 was added as an OSC material to slurry 2 for forming the upper-layer coating so that the coating amount was adjusted to 24 g/L based on the substrate volume.

Comparative Example 8

S/C was obtained in the same manner as in Comparative Example 6 except that the ceria-zirconia-based composite oxide (Pr-containing pyrochlore CZ) of Comparative Example 1 was added as an OSC material to slurry 2 for forming the upper-layer coating so that the coating amount was adjusted to 24 g/L based on the substrate volume.

Comparative Example 9

S/C was obtained in the same manner as in Comparative Example 6 except that CZ was added as an OSC material to slurry 2 for forming the upper-layer coating so that the coating amount was adjusted to 25 g/L based on the substrate volume.

Comparative Example 10

S/C was obtained in the same manner as in Comparative Example 6 except that ACZ-2 was added as an OSC material to slurry 2 for forming the upper-layer coating so that the coating amount was adjusted to 24 g/L based on the substrate volume.

Comparative Example 11

S/C was obtained in the same manner as in Comparative Example 6 except that fluorite-type CZ was added as an OSC material to slurry 2 for forming the upper layer so that the coating amount was adjusted to 24 g/L based on the substrate volume.

Table 2 shows the position and amount (coating amount) of OSC material added and OSC material properties of S/C in Examples 3 to 7 and Comparative Examples 6 to 11.

TABLE 2

| | Addition position | Addition amount (g/L) | Crystal structure | $CeO_2$ (%) | D50 (μm) |
|---|---|---|---|---|---|
| Example 3 | Upper layer | 16 | Pyrochlore | 52 | 4.9 |
| Example 4 | Upper layer | 24 | Pyrochlore | 52 | 4.9 |
| Example 5 | Upper layer | 48 | Pyrochlore | 52 | 4.9 |
| Example 6 | Upper layer | 55 | Pyrochlore | 52 | 4.9 |
| Example 7 | Lower layer | 24 | Pyrochlore | 52 | 4.9 |
| Comparative Example 6 | None | 0 | — | — | — |
| Comparative Example 7 | Upper layer | 24 | Pyrochlore | 52 | 11.2 |
| Comparative Example 8 | Upper layer | 24 | Pyrochlore | 52 | 0.5 |
| Comparative Example 9 | Upper layer | 25 | Fluorite | 30 | 6 |
| Comparative Example 10 | Upper layer | 24 | Fluorite | 20 | 6 |
| Comparative Example 11 | Upper layer | 24 | Fluorite | 52 | 6.1 |

The durability test was implemented for performance evaluation of S/C in Examples 3 to 7 and Comparative Examples 6 to 11.

Durability Test

S/C obtained in each of Examples 3 to 7 and Comparative Examples 6 to 11 was attached to the exhaust system of a V-type eight-cylinder engine. The durability test was implemented by repeatedly introducing exhaust gas of a stoichiometric atmosphere and that of a lean atmosphere in turn for a certain period of time (at a ratio of 3:1) at a catalyst bed temperature of 950° C. for 50 hours.

Performance Evaluation

S/C of each example after the durability test was attached to an L4 engine, followed by performance evaluation regarding the following items.

OSC

S/C of each example after the durability test was attached to an L4 engine. The inlet gas temperature was set to 500° C. The air-fuel ratio (A/F) was feedback-controlled to target levels of 14.4 and 15.1. The maximum oxygen storage amount (Cmax) was obtained in the same manner as in the OSC test for the catalyst for purifying exhaust gas, and it was evaluated as OSC.

T50-NOx

Exhaust gas (A/F=14.4) was supplied to each S/C after the durability test. The temperature at which the NOx purification rate reached 50% (T50-NOx) was measured when increasing temperature to 500° C. under high Ga conditions (Ga=35 g/s) so as to evaluate catalyst activity.

Figure 3:
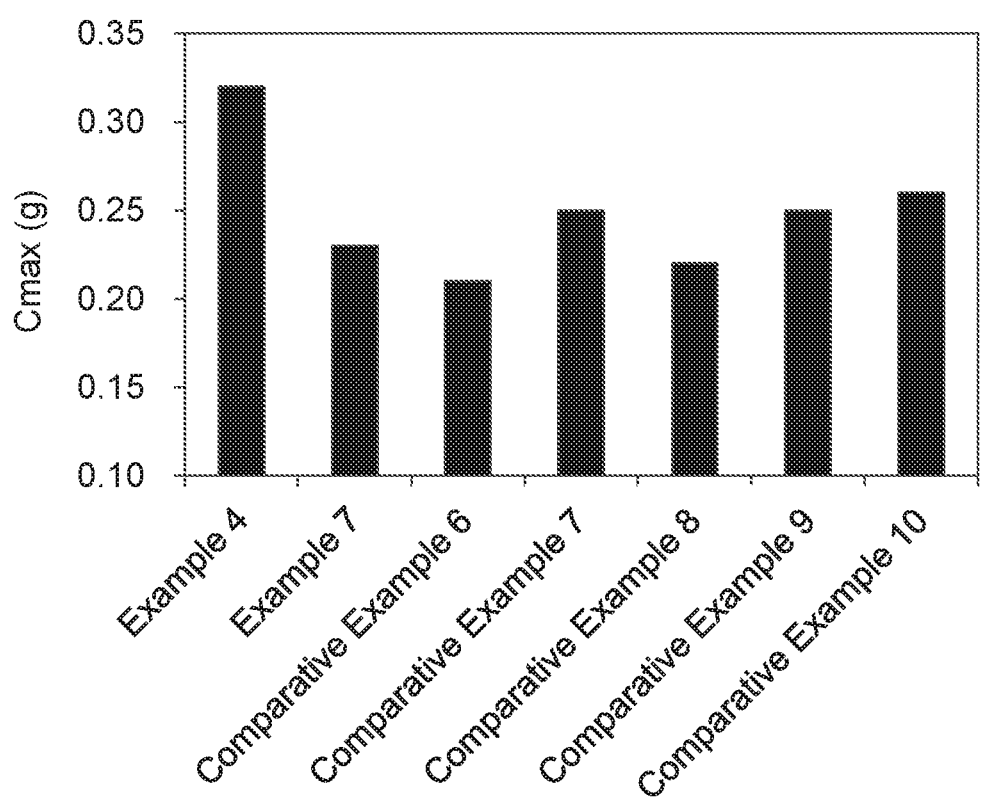
FIG. 3 shows the maximum oxygen storage amount (Cmax) of S/C in Examples 4 and 7 and Comparative Examples 6 to 10.
Figure 4:
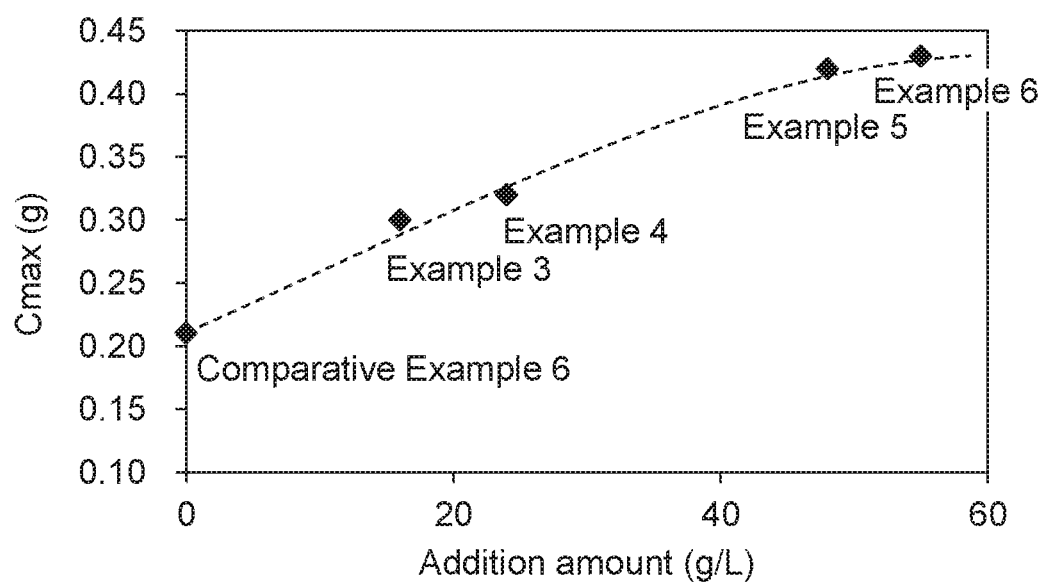
FIG. 4 shows the relationship between the amount of OSC material (the ceria-zirconia-based composite oxide of Example 2) added to the upper-layer coating and the maximum oxygen storage amount (Cmax).
Figure 5:
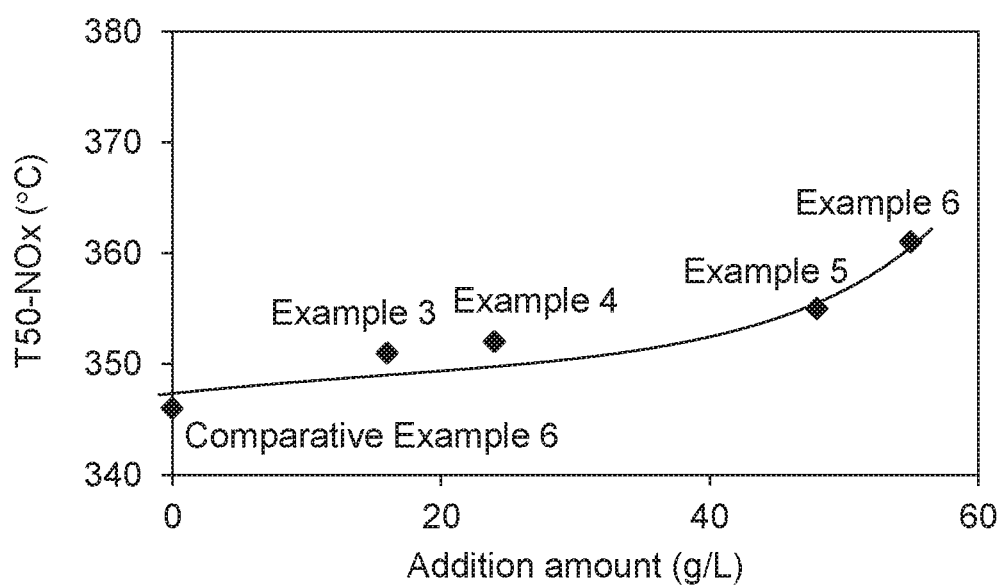
FIG. 5 shows the relationship between the amount of OSC material (the cerin-zirconia-based composite oxide of Example 2) added to the upper-layer coating and T50-NOx.

FIGS. 3 to 5 show the results. FIG. 3 shows the maximum oxygen storage amount (Cmax) of S/C in Examples 4 and 7 and Comparative Examples 6 to 10. FIG. 4 shows the relationship between the amount of OSC material (ceria-zirconia-based composite oxide of Example 2) added to the upper-layer coating and the maximum oxygen storage amount (Cmax). FIG. 5 shows the relationship between the amount of OSC material (ceria-zirconia-based composite oxide of Example 2) added to the upper-layer coating and T50-NOx.

FIG. 3 indicates that OSC of S/C comprising the ceria-zirconia-based composite oxide of the exemplary embodiments significantly improved, compared with that of S/C comprising any other OSC material (Example 4 and Comparative Examples 7 to 10). The ceria-zirconia-based composite oxide of the exemplary embodiments has high OSC performance, suggesting that it allows a catalyst to be downsized without causing an increase in pressure loss. It is also suggested that OSC performance of S/C increases in a case in which the ceria-zirconia-based composite oxide of the exemplary embodiments is contained in the uppermost catalyst coating layer that is easily brought into contact with exhaust gas, compared with a case in which the same is contained in the lower layer (Examples 4 and 7).

Further, FIG. 4 indicates that OSC performance of S/C improves in accordance with the amount of the ceria-zirconia-based composite oxide of the exemplary embodiments added to the upper-layer coating. Meanwhile, FIG. 5 indicates that NOx purification capacity decreases at low temperatures with an increase in the amount of the ceria-zirconia-based composite oxide of the exemplary embodiments added to the upper-layer coating. FIGS. 4 and 5 indicate that the amount of the ceria-zirconia-based composite oxide of the exemplary embodiments is preferably 5 to 50 g/L in S/C, in which the cerin-zirconia-based composite oxide of the exemplary embodiments is contained in the uppermost catalyst coating layer, because favorable OSC performance and NOx purification capacity can be achieved at the same time.

Next, in order to evaluate performance of S/C prepared by adding the ceria-zirconia-based composite oxide of the exemplary embodiments as an OSC material to a layer other than the uppermost layer, S/C was prepared as described below in Examples 8 to 12 and Comparative Examples 12 to 15.

Examples 8-11

S/C was obtained in the same manner as in Comparative Example 6 except that the ceria-zirconia-based composite oxide (Pr-containing pyrochlore CZ) of Example 2 was added to slurry 1 for forming the lower-layer coating so that the coating amount was adjusted to 6 g/L, 12 g/L, 24 g/L, and 35 g/L based on the substrate volume in Examples 8, 9, 10, and 11, respectively.

Example 12

Preparation in Example 12 was carried out as in Example 3.

Comparative Example 12

Preparation in Comparative Example 12 was carried out as in Comparative Example 6.

Comparative Examples 13 and 14

S/C was obtained in the same manner as in Comparative Example 6 except that the ceria-zirconia-based composite oxide (Pr-containing pyrochlore CZ) of Comparative Example 2 was added to slurry 1 for forming the lower-layer coating so that the coating amount was adjusted to 9 g/L and 20 g/L based on the substrate volume in Comparative Examples 13 and 14, respectively.

Comparative Example 15

S/C was obtained in the same manner as in Comparative Example 6 except that fluorite-type CZ was added to slurry 1 for forming the lower-layer coating so that the coating amount was adjusted to 6 g/L based on the substrate volume.

Table 3 shows the position and amount (coating amount) of OSC material added and OSC material properties of S/C in Examples 8-12 and Comparative Examples 12-15.

The durability test was implemented for performance evaluation of S/C in Examples 8 to 12 and Comparative Examples 12 to 15.

<Durability Test>

S/C obtained in each of Examples 8 to 12 and Comparative Examples 12 to 15 was attached to the exhaust system of a V-type eight-cylinder engine. The durability test was implemented by repeatedly introducing exhaust gas of a stoichiometric atmosphere and that of a lean atmosphere in turn for a certain period of time (at a ratio of 3:1) at a catalyst bed temperature of 950° C. for 50 hours.

<Performance Evaluation>

S/C of each example after the durability test was attached to an IA engine, followed by performance evaluation regarding the following items.

Steady NOx purification rate: The NOx purification rate during a steady operation at A/F=14.1 and 500° C. was calculated.

NOx purification capacity upon A/F switching: NOx emission upon feedback control of A/F to target levels of 14.1 and 15.1 was measured. The inlet gas temperature was set to 500° C.

Figure 6:
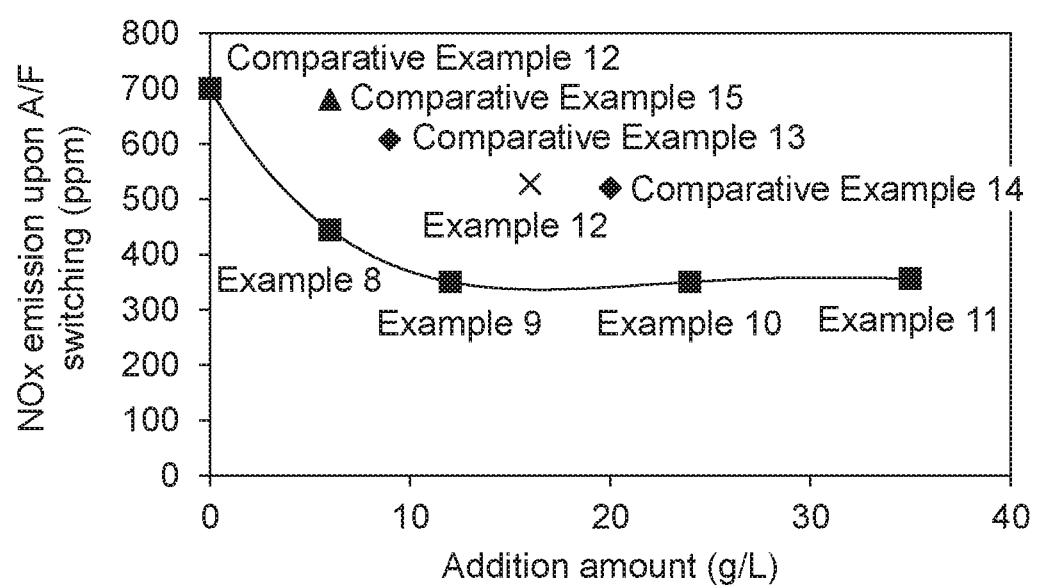
FIG. 6 shows the relationship between the amount of OSC material (the ceria-zirconia-based composite oxide of Example added to the lower-layer coating and the NOx emission upon A/F switching.
Figure 7:
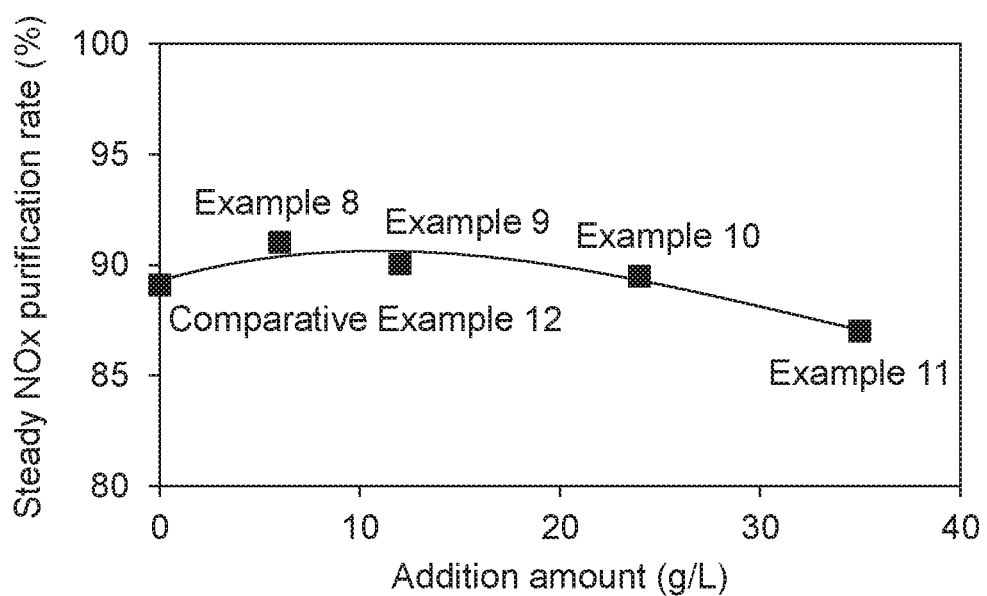
FIG. 7 shows the relationship between the amount of OSC material (the ceria-zirconia-based composite oxide of Example 2) added to the lower-layer coating and the steady NOx purification rate.

Table 3 and FIGS. 6 and 7 show the results. FIG. 6 shows the relationship between the amount of OSC material (the ceria-zirconia-based composite oxide of Example 2) added to the lower-layer coating and the NOx emission upon A/F switching. FIG. 7 shows the relationship between the amount of OSC material (the ceria-zirconia-based composite oxide of Example 2) added to the lower-layer coating and the steady NOx purification rate.

Table 3 and FIG. 6 indicate that the NOx emission upon A/F switching in the case of S/C comprising the ceria-zirconia-based composite oxide of the exemplary embodiments is significantly lower than that in the case of S/C comprising any other OSC material. In addition, regarding steady NOx purification capacity and NOx purification capacity upon A/F switching, when the lower-layer coating comprises the ceria-zirconia-based composite oxide of the exemplary embodiments, these performance parameters are superior to those when the upper-layer coating comprises the same, which is advantageous in reduction of NOx emission during mode traveling. Moreover, Table 3 and FIGS. 6 and 7 indicate that when the amount of the ceria-zirconia-based

TABLE 3

| | Addition position | Addition amount (g/L) | OSC material Crystal structure | $CeO_2$ (%) | D50 (μm) | Steady NOx purification rate (%) | NOx emission (ppm) upon A/F switching |
|---|---|---|---|---|---|---|---|
| Example 8 | Lower layer | 6 | Pyrochlore | 52 | 4.9 | 91.0 | 444 |
| Example 9 | Lower layer | 12 | Pyrochlore | 52 | 4.9 | 90.0 | 350 |
| Example 10 | Lower layer | 24 | Pyrochlore | 52 | 4.9 | 89.5 | 350 |
| Example 11 | Lower layer | 35 | Pyrochlore | 52 | 4.9 | 87.0 | 356 |
| Example 12 | Upper layer | 16 | Pyrochlore | 52 | 4.9 | 67.4 | 527 |
| Comparative Example 12 | None | 0 | — | — | — | 89.1 | 700 |
| Comparative Example 13 | Lower layer | 9 | Pyrochlore | 52 | 11.2 | 90.2 | 608 |
| Comparative Example 14 | Lower layer | 20 | Pyrochlore | 52 | 11.2 | 89.0 | 520 |
| Comparative Example 15 | Lower layer | 6 | Fluorite | 27 | 6.1 | 90.0 | 680 | composite oxide of the exemplary embodiments added to the lower-layer coating is from 5 to 30 g/L, the low amount of NOx emission upon A/F switching and the high steady NOx purification capacity can be achieved at the same time.

<Underfloor Catalyst (UF/C)>

The following materials were used as materials for catalysts.

$Al_2O_3$: Composite of $Al_2O_3$ and $La_2O_3$ (4% by weight) (Sasol)

ACZ-2: Composite oxide of $Al_2O_3$ (30% by weight), $CeO_2$ (20% by weight), $ZrO_2$ (44% by weight), $Nd_2O_3$ (2% by weight), $La_2O_3$ (2% by weight), and $Y_2O_3$ (2% by weight) (Daiichi Kigenso Kagaku Kogyo Co., Ltd.)

AZ: Composite oxide of $Al_2O_3$ (30% by weight), $ZrO_2$ (60% by weight), $Nd_2O_3$ (2% by weight), $La_2O_3$ (4% by weight), and $Y_2O_3$ (4% by weight) (Daiichi Kigenso Kagaku. Kogyo Co., Ltd.)

OSC Material:
Ceria-zirconia-based composite oxide (Pr-containing pyrochlore CZ) of Example 2
ACZ-2 described above
Fluorite-type ZC: Fluorite-type ZC composite oxide of $CeO_2$ (21% by weight), $ZrO_2$ (72% by weight), $Nd_2O_3$ (5.3% by weight), and $La_2O_3$ (1.7% by weight) (Daiichi Kigenso Kagaku Kogyo Co., Ltd.)

Honeycomb substrate: 875-cc cordierite honeycomb substrate (having 400 square cells with a wall thickness of 4 mil)

UF/C was prepared in the manner described below.

Comparative Example 16

(a) Preparation of the Lower-Layer Coating

Pd/ACZ-2, in which Pd was carried by ACZ-2, was prepared using ACZ-2 and palladium nitrate by the impregnation method. Certain amounts of Pd/ACZ-2, $Al_2O_3$, and an $Al_2O_3$-based binder were added to distilled water during stirring and suspended therein. Thus, slurry 1 was prepared. The prepared slurry 1 was poured into a substrate and an unnecessary portion thereof was blown off using a blower so that the substrate wall face was coated. The coating was adjusted to contain Pd at 0.53 g/L, $Al_2O_3$ at 40 g/L, and ACZ-2 at 93 g/L based on the substrate volume. The coating was dried using a dryer maintained at 120° C. for 2 hours and calcined in an electric furnace at 500° C. for 2 hours. Thus, the lower-layer coating was made.

(b) Preparation of the Upper-Layer Coating

Rh/AZ, in which Rh was carried by AZ, was prepared using AZ and rhodium nitrate by the impregnation method. Certain amounts of Rh/AZ, $Al_2O_3$, and an $Al_2O_3$-based binder were added to distilled water during stirring and suspended therein. Thus, slurry 2 was prepared. The obtained slurry 2 was poured into the substrate prepared by coating in (a) above and an unnecessary portion thereof was blown off using a blower so that the lower-layer coating of the substrate wall face was coated. The coating was adjusted to contain Rh at 0.4 g/L, $Al_2O_3$ at 35 g/L, and AZ at 33 g/L based on the substrate volume. The coating was dried using a dryer maintained at 120° C. for 2 hours and calcined in an electric furnace at 500° C. for 2 hours. Thus, UF/C, in which the upper-layer coating was formed on the lower-layer coating, was obtained.

Examples 13 to 16

UF/C was obtained in the same manner as in Comparative Example 16 except that the ceria-zirconia-based composite oxide (Pr-containing pyrochlore CZ) of Example 2 was added to slurry 2 for forming the upper-layer coating so that the coating amount was adjusted to 11 g/L, 20 g/L, 31 g/L and 40 g/L based on the substrate volume in Examples 13, 14, 15, and 16, respectively.

Example 17

UF/C was obtained in the same manner as in Comparative Example 16 except that the ceria-zirconia-based composite oxide of Example 2 was added to slurry 1 for forming the lower-layer coating so that the coating amount was adjusted to 11 g/L based on the substrate volume.

Comparative Example 17

UF/C was obtained in the same manner as in Comparative Example 16 except that ACZ-2 was added to slurry 2 for forming the upper-layer coating so that the coating amount was adjusted to 11 g/L based on the substrate volume.

Comparative Example 18

UF/C was obtained in the same manner as in Comparative Example 16 except that fluorite-type ZC was added to slurry 2 for forming the upper-layer coating so that the coating amount was adjusted to 11 g/L based on the substrate volume.

Table 4 shows the position and amount (coating amount) of OSC material added and OSC material properties of UF/C in Examples 13 to 17 and Comparative Examples 16 to 18.

TABLE 4

| | Addition position | Addition amount (g/L) | OSC material Crystal structure | $CeO_2$ (%) | D50 (μm) |
|---|---|---|---|---|---|
| Example 13 | Upper layer | 11 | Pyrochlore | 52 | 4.9 |
| Example 14 | Upper layer | 20 | Pyrochlore | 52 | 4.9 |
| Example 15 | Upper layer | 31 | Pyrochlore | 52 | 4.9 |
| Example 16 | Upper layer | 40 | Pyrochlore | 52 | 4.9 |
| Example 17 | Lower layer | 11 | Pyrochlore | 52 | 4.9 |
| Comparative Example 16 | None | 0 | — | — | — |
| Comparative Example 17 | Upper layer | 11 | Fluorite | 20 | 8 |
| Comparative Example 18 | Upper layer | 11 | Fluorite | 21 | 2 |

The durability test was implemented for performance evaluation of UF/C in Examples 13 to 17 and Comparative Examples 16 to 18.

<Durability Test>

UF/C obtained in each of Examples 13 to 17 and Comparative Examples 16 to 18 was attached to the exhaust system of a V-type eight-cylinder engine. The durability test was implemented by repeatedly introducing exhaust gas of a stoichiometric atmosphere and that of a lean atmosphere in turn for a certain period of time (at a ratio of 3:1) at a catalyst bed temperature of 950° C. for 50 hours.

<Performance Evaluation>

UF/C of each example after the durability test was attached to an L4 engine, followed by performance evaluation regarding the following items.

Steady HC Purification Rate

The HC purification rate during the steady operation at A/F=14.4 and 550° C. was calculated.

T50-NOx

Exhaust gas (A/F=14.4) was supplied to each UF/C after the durability test. The temperature at which the NOx purification rate reached 50% (T50-NOx) was measured while decreasing temperature to 250° C. under high Ga conditions (Ga=35 g/s) so as to evaluate catalyst activity.

Figure 8:
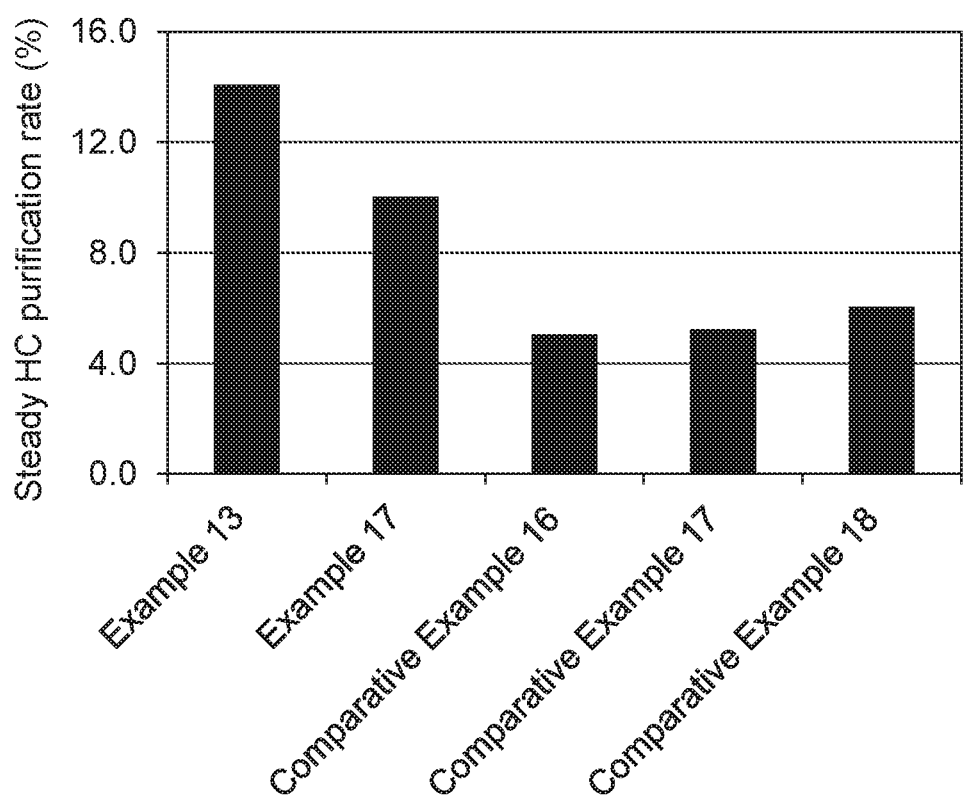
FIG. 8 shows the steady HC purification rate of UF/C in Examples 13 and 17 and Comparative Examples 16 to 18.
Figure 9:
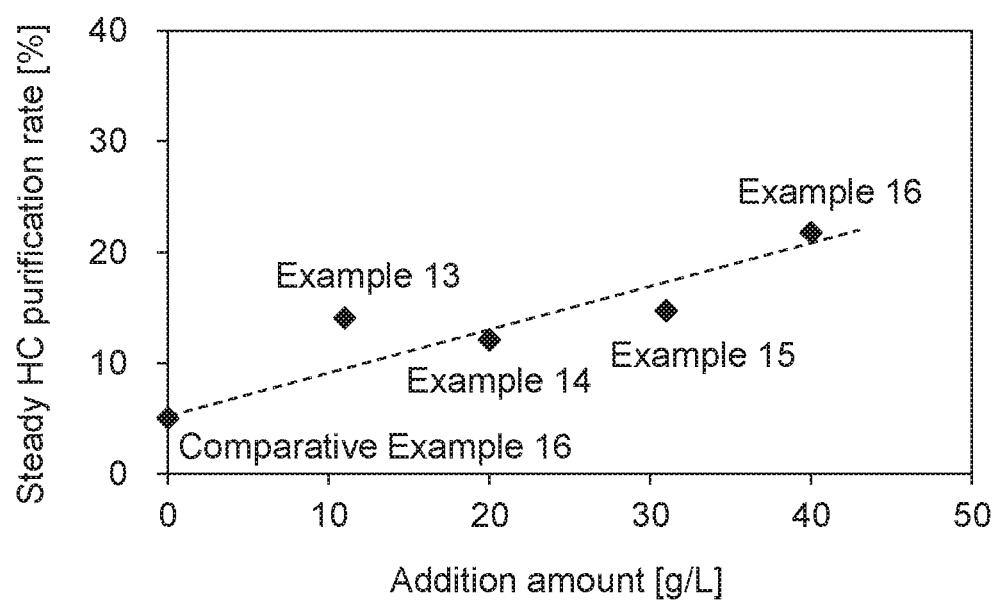
FIG. 9 shows the relationship between the amount of OSC material (the ceria-zirconia-based composite oxide of Example 2) added to the upper-layer coating and the steady FTC purification rate.
Figure 10:
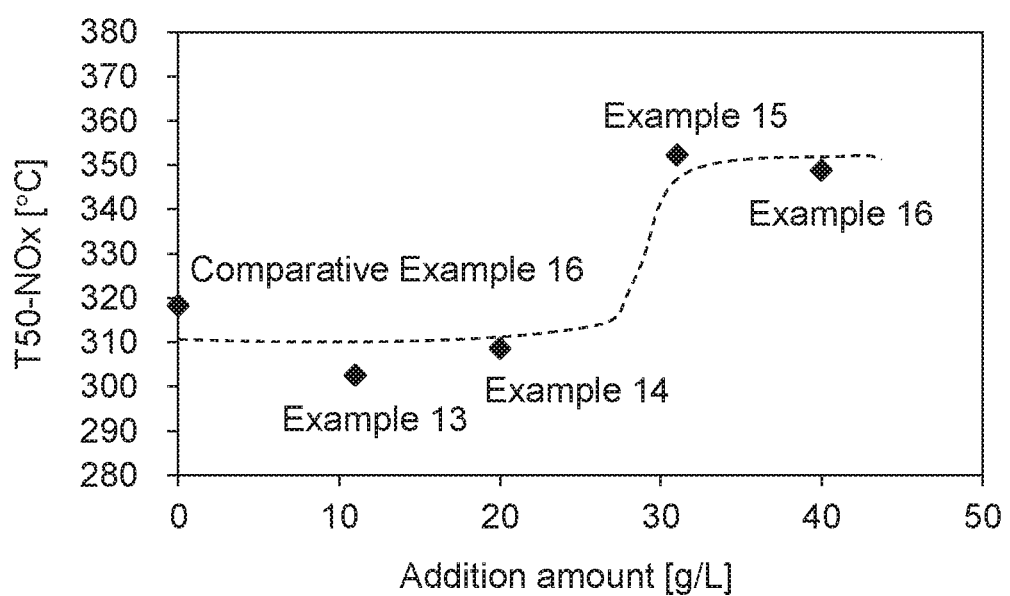
FIG. 10 shows the relationship between the amount of OSC material (the ceria-zirconia-based composite oxide of Example 2) added to the upper-layer coating and T50-NOx.

FIGS. 8 to 10 show the results. FIG. 8 shows the steady HC purification rate of UF/C in Examples 13 and 17 and Comparative Examples 16 to 18. FIG. 9 shows the relationship between the amount of OSC material (ceria-zirconia-based composite oxide of Example 2) added to the upper-layer coating and the steady HC purification rate. FIG. 10 shows the relationship between the amount of OSC material (ceria-zirconia-based composite oxide of Example 2) added to the upper-layer coating and T50-NOx.

FIG. 8 indicates that steady HC purification rate of UF/C comprising the ceria-zirconia-based composite oxide of the exemplary embodiments significantly improved, compared with that of UF/C comprising any other OSC material (Examples 13 and 17 and Comparative Examples 17 to 18). The ceria-zirconia-based composite oxide of the exemplary embodiments has high steady HC purification capacity, suggesting that it allows a catalyst to be downsized without causing an increase in pressure loss. It is also suggested that steady HC purification rate of UF/C increases in a case in which the ceria-zirconia-based composite oxide of the exemplary embodiments is contained in the uppermost catalyst coating layer that is easily brought into contact with exhaust gas, compared with a case in which the same is contained in the lower layer (Examples 13 and 17).

Further, FIG. 9 indicates that the steady HC purification rate improves in accordance with the amount of the ceria-zirconia-based composite oxide of the exemplary embodiments added to the upper-layer coating. Meanwhile, FIG. 10 indicates that NOx purification capacity decreases at low temperatures when the amount of the ceria-zirconia-based composite oxide of the exemplary embodiments added to the upper-layer coating is from 20 g/L to 30 g/L. Accordingly, the amount of the ceria-zirconia-based composite oxide of the exemplary embodiments is preferably within a range of 5 to 20 g/L in UF/C, in which the ceria-zirconia-based composite oxide of the exemplary embodiments is contained in the uppermost catalyst coating layer, because favorable steady HC purification capacity and NOx purification capacity can be achieved at the same time.

All publications, patents, and patent applications cited herein are incorporated herein by reference in their entirety.

What is claimed is:

1. A catalyst for purifying exhaust gas, which has a substrate and a catalyst coating layer formed on the substrate,
   wherein the catalyst coating layer comprises a ceria-zirconia-based composite oxide having a pyrochlore structure in an amount of 5 to 100 g/L based on the volume of the substrate,
   wherein the ceria-zirconia-based composite oxide is a secondary particle and has a secondary particle size (D50) of 3 µm to 7 µm, and
   wherein the ceria-zirconia-based composite oxide optionally contains praseodymium.

2. The catalyst according to claim 1, wherein the catalyst is a start-up catalyst (S/C) or an underfloor catalyst (UF/C) of a catalyst system for purifying exhaust gas including S/C and UF/C that is disposed downstream from the S/C along the flow direction of exhaust gas.

3. The catalyst according to claim 2, wherein the catalyst is S/C that has at least two catalyst coating layers, and the uppermost catalyst coating layer contains the ceria-zirconia-based composite oxide in an amount of 5 to 50 g/L based on the volume of the substrate.

4. The catalyst according to claim 2, wherein the catalyst is S/C that has at least two catalyst coating layers, and at least one catalyst coating layer other than the uppermost catalyst coating layer contains the ceria-zirconia-based composite oxide in an amount of 5 to 30 g/L based on the volume of the substrate.

5. The catalyst according to claim 2, wherein the catalyst is UF/C that has at least two catalyst coating layers, and the uppermost catalyst coating layer contains the ceria-zirconia-based composite oxide in an amount of 5 to 20 g/L based on the volume of the substrate.

6. The catalyst according to claim 1, wherein the ceria-zirconia-based composite oxide contains praseodymium.

* * * * *